Dec. 25, 1962
H. S. CRIM
3,069,849
PROPELLANT MIXTURE CONTROL
Filed Oct. 5, 1960
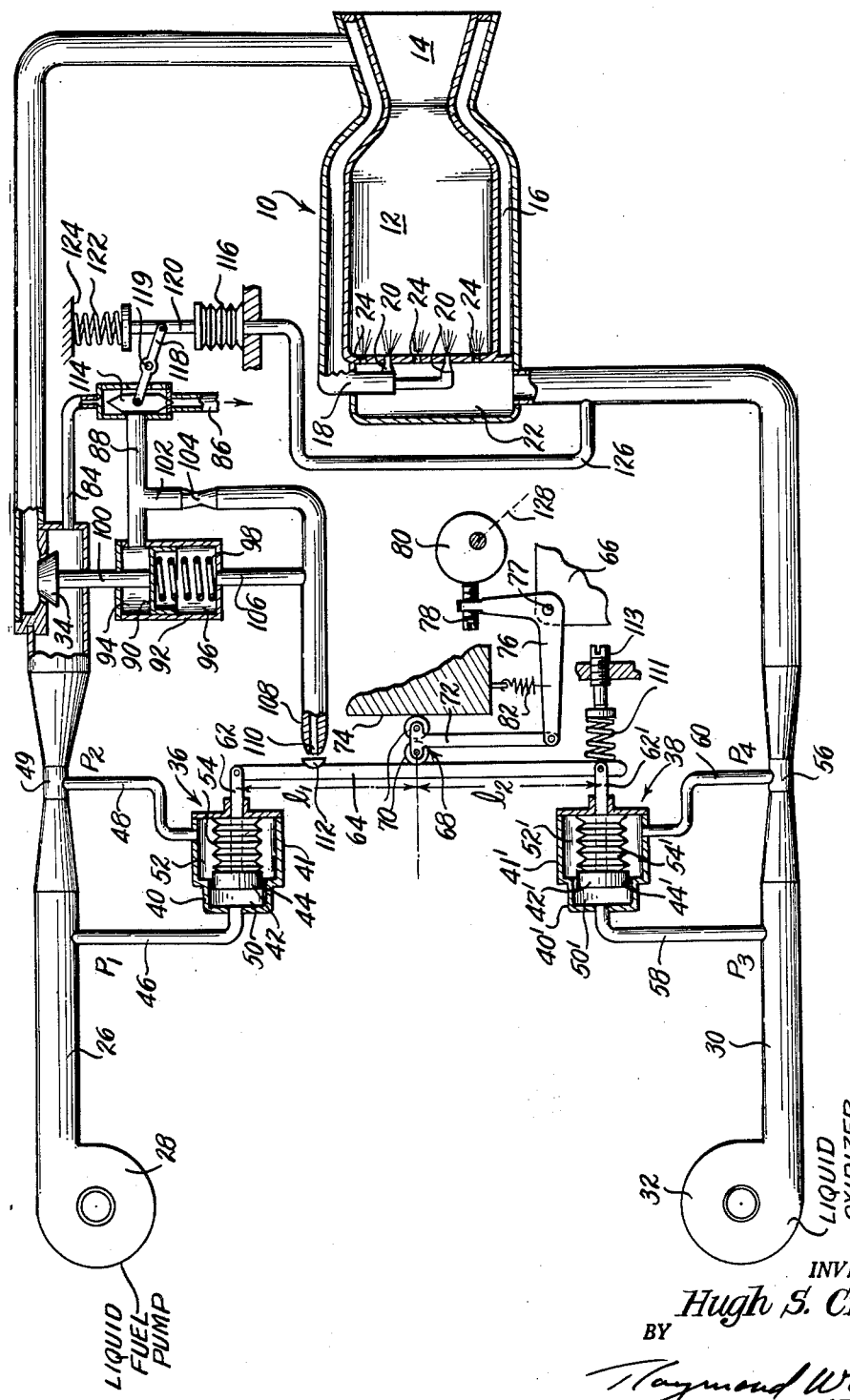
INVENTOR.
Hugh S. Crim
BY
Raymond W Colton
ATTORNEY United States Patent Office 3,069,849
Patented Dec. 25, 1962

3,069,849
PROPELLANT MIXTURE CONTROL
Hugh S. Crim, Glastonbury, Conn., assignor to United
Aircraft Corporation, East Hartford, Conn., a corporation of Delaware
Filed Oct. 5, 1960, Ser. No. 60,676
16 Claims. (Cl. 60—35.6)

This invention relates to a novel propellant mixture control especially adapted for, but not limited to the feeding of propellants to the combustion chamber of a rocket motor.

Rocket motors of the type disclosed, termed bi-propellant rocket motors, operate on two propellants which are separately fed to and mixed within the combustion chamber wherein they are burned to produce high temperature combustion products, the products being discharged through the reaction nozzle to provide the thrust. The propellants comprise a liquid fuel and a liquid oxidizer, the combination being selected to furnish a high heat release. Rockets of this type are required to handle large quantities of propellants to furnish the high thrusts for which they are designed, and, in order to operate as efficiently as possible, the respective supplies of fuel and oxidizer must be proportioned to provide the optimum mixture when introduced into the combustion chamber.

It has been suggested to control the flow by maintaining a predetermined rate of flow of each of the propellants to the combustion chamber. Such control does not take into account the mass flow of propellant per unit of time. In other words, if we assume that the supply line has a definite cross section and that the propellant is fed at a certain speed through the line, the volume of flow per unit of time is the product of the speed of flow and the cross sectional area of the feed line at the point where the speed of flow is measured. Such a control, however, does not provide a constant mass flow rate at all temperatures. As the mass is a function of the density, it is evident that the mass of a volume of flow at one temperature will not be the same as the mass of a volume of flow at another temperature.

It is an object of this invention, therefore, to provide a novel control system for a combustion chamber which maintains a predetermined fuel-oxidizer propellant ratio, irrespective of the variation in temperature of the several propellants.

It is a further object to provide a novel control system for a combustion chamber which maintains a predetermined fuel-oxidizer propellant ratio, irrespective of the variation in temperature of one or both of the propellants, and in which the ratio may be selectively varied.

It is a still further object to provide a novel control system for a combustion chamber in which a control valve, in one feed line, maintains a predetermined mass flow rate of propellant to the combustion chamber, the valve being normally closed, but is opened in response to the feed of propellant in both feed lines, and which automatically closes in response to failure of propellant feed in either feed line.

The above and other objects will become apparent in the following description of the construction and operation when considered with the accompanying drawing showing a diagrammatic system of a preferred embodiment.

Referring to the single FIGURE of the drawing the reference numeral 10 designates a rocket motor of the bi-propellant type having a combustion chamber 12 and a rearwardly directed reaction nozzle 14. A jacket 16 surrounds the combustion chamber 12 and reaction nozzle 14, through which one of the propellants delivered to the combustion chamber is fed for the purpose of cooling the rocket motor and preheating the propellant to promote combustion. The head of the combustion chamber includes a first propellant manifold 18 from which leads a series of first propellant injector nozzles 20, and a second propellant manifold 22 from which leads a series of second propellant nozzles 24, both series of nozzles 20 and 24 being arranged in a predetermined relative arrangement to discharge the propellants into the combustion chamber to facilitate mixing and combustion. The first propellant manifold 18 is connected with the cooling jacket 16 to receive the preheated propellant therefrom, which in the arrangement shown, is the liquid fuel propellant.

A first propellant feed line 26, which may deliver a liquid fuel, is connected at one end with a first pump 28, the other end being connected with the nozzle end of the cooling jacket 16 as shown. A second propellant feed line 30 is connected at one end with a second pump 32, the other end being connected with the manifold 22. The second propellant feed line may be supplied with a liquid oxidizer, the propellants being separately injected into and mixed in the combustion chamber 12 where they are burned, and the resulting products of combustion are discharged through the reaction nozzle 14 to provide the propulsive thrust.

The pumps 28 and 32 may be driven from a single motor or each may be driven from a separate motor. Any conventional driving means may be employed, as the invention is not concerned with the particular means used.

In operation, the pumps 28 and 32 supply propellants to the rocket motor at a controlled rate. The thrust furnished by rocket motors of this type is a function of the rate of the mass flow of combustion products through the nozzle 14 which depends upon the volume of the gases and their velocity. The velocity, in turn, is a function of the temperature of the gases produced by combustion, and such rocket motors are usually designed and operated to provide for exceedingly high heat releases, involving the feeding of large quantities of fuel and oxidizer to the combustion chamber. The attainment of high efficiencies and temperatures depends upon the complete and rapid combustion of the propellants, which is achieved by maintaining the correct ratio of mass flow of the separate propellants into the combustion chamber under all conditions of operation. As the temperature of the propellants is not uniform under all conditions of the operation, it is evident that means must be provided to compensate the rate of flow of propellants as a function of the temperature of the propellants to maintain the proper mixture under such changing conditions.

The invention, therefore, includes a control system to maintain a predetermined mass flow rate of propellants in both feed lines under all conditions of operation. By "mass flow rate of propellant" is meant a uniform rate of mass of propellant per unit of time. This should not be confused with a control system which maintains a predetermined volume per unit of time. The mass of a substance is a function of its density, which varies with temperature, and therefore, a system which maintains a predetermined mass flow rate must provide for change in density as the temperature varies.

The control system includes a valve 34, which may be disposed in one of the propellant feed lines, shown, in the preferred embodiment, in the first propellant feed line 26 between the pump 28 and the rocket motor 10. A first mass flow rate sensing means 36 is connected with the first propellant feed line 26, and a second mass flow rate sensing means 38 is connected with the second propellant feed line 30.

The first sensing means 36 comprises a two diameter cylinder having a first section 40 of a certain diameter, and a second section 41 of larger diameter, the sections 40 and 41 being connected as shown. A piston 42, having a diameter slightly less than the internal diameter of the first section 40, is mounted with portions thereof extending into both cylinder sections to provide a clearance or annular gap 44 between the outer periphery of the piston 42 and the internal wall of the first cylinder section 40. A first pressure tap connection 46 is provided between the first propellant feed line 26 and a pressure chamber 50 in the interior of the first cylinder section 40 whereby one face of the piston 42 is exposed to the pressure in the feed line 26, and a second pressure tap 48 is provided between a restriction 49 in the propellant feed line 26 and a pressure chamber 52 in the second cylinder section 41 whereby the other face of the piston 42 is exposed to the pressure of the propellant in the restriction 49. According to Bernoulli's Theorem, the static pressure in a fluid line varies inversely with the velocity therein, and as the velocity of flow in the restriction 49 is greater than that in the feed line 26 upstream and downstream thereof, the static pressure is proportionately less. It is evident, therefore, that the static pressure $P_1$ in the connection 46, acting in the pressure chamber 50 on the left hand face of the piston 42, is greater than the pressure $P_2$ in the connection 48 acting in the pressure chamber 52 on the right hand face of the piston 42, and that, because of the pressure difference in the pressure chambers 50 and 52, there is a flow of propellant from the connection 46, through the annular gap or clearance 44 and through the connection 48 into the restriction 49. The cross sectional area of the gap 44 and the cross sectional areas of the connections 46 and 48 are designed to provide a predetermined pressure drop across the piston 42, allowing a predetermined rate of flow of propellant through the annular gap 44, which decreases the pressure that would otherwise be effective in the pressure chamber 50 on the left hand face of the piston 42. It is also evident that the rate of flow through the annular gap 44 depends upon the axial length of the gap. A movement of the piston 42 toward the left in the first section 40 with a corresponding increase of the axial length of the annular gap would produce a longer path of travel of the propellant through the gap and a corresponding greater resistance to flow, and a movement of the piston 42 toward the right in the second section 41 with a corresponding decrease of the axial length of the annular gap 44 would produce a shorter axial length of the annular gap and a corresponding decrease in the resistance of flow. An increase in the resistance to flow through the annular gap, assuming no change in the density of the propellant, would result in a greater pressure drop across the gap. Likewise, a decrease in the resistance to flow through the annular gap 44, and assuming no change in the density of the propellant, would result in a smaller pressure drop across the gap. Similarly, an increase in density, resulting from a temperature change or from any other cause, with no change in the axial length of the annular gap, would result in a greater pressure drop across the annular gap 44, and a decrease in density with no change in the axial length of the gap 44 would result in a smaller pressure drop across the annular gap.

In order to compensate for the variation in density of the propellant with changes of temperature thereof, a bellows 54 is provided in the pressure chamber 52, connected at one end to the piston 42 and at the other end to the end wall of the pressure chamber. The bellows 54 is filled with a suitable temperature-responsive fluid and is disposed in the path of propellant flow through the pressure connection 46, pressure chamber 50, annular gap 44, pressure chamber 52 and pressure connection 48, whereby the fluid within the bellows will sense temperature changes in the propellant.

The propellant feed line 30 includes a restriction 56. The second mass flow rate sensing means 38 includes a two diameter cylinder having a first cylinder section 40' and a second cylinder section 41', the second cylinder section having a larger diameter than the first cylinder section. A loose fitting piston 42' is movably supported between the first and second cylinder sections, the piston having an external diameter less than the internal diameter of the first cylinder section 40' to form an annular gap 44'. The first cylinder section 40' forms a first pressure chamber 50' on one side of the piston 42', and the second cylinder section 41' forms a second pressure chamber 52' on the other side of the piston. The first pressure chamber 50' is connected with the second propellant feed line 30 by a connection 58, and the second pressure chamber 52' is connected with the restriction 56 by a connection 60. A bellows 54' in the second pressure chamber 52', filled with a temperature-responsive fluid, is connected at one end to the piston 42' and at the other end to the end wall of the pressure chamber 52'.

The pistons 42 and 42' are connected at one end to piston rods 62 and 62', respectively, the opposite ends of the piston rods being pivotally connected with opposite ends of a pivoted lever 64, whereby movement of the pistons 42 and 42' causes movement of the lever 64 about its fulcrum 68. Fulcrum 68 is capable of being shifted to vary the effective lengths $l_1$ and $l_2$ between the fulcrum and the pivotal points of connection with the piston rods 62 and 62', and includes a pair of rollers 70 mounted on one end of a rod 72. One of the rollers 70 is in rolling contact with a side of the lever 64, and the other roller 70 is in rolling contact with a fixed abutment 74. The other end of the rod 72 is pivotally connected with one arm of a bell crank lever 76 pivoted at 77 to a suitable support 66, the other arm of the lever carrying an adjustable screw 78 in contact with the periphery of a cam 80. A tension spring 82, acting on one arm of the bell crank lever 76, urges the screw 78 into contact with the periphery of the cam 80.

A fluid pressure system for operating the valve 34 includes a pressure tap 84 from the first propellant feed line 26, upstream of the valve, to be fed with propellant under pressure when the pump 28 is in operation. A first branch 86 from the pressure tap 84 leads to a low pressure point or drain, which may be the inlet to the pump 28. A second branch 88 leads from the pressure tap 84 to a servomotor comprising a piston 90 movably mounted within a cylinder 92, having a pressure chamber 94 on one side of the piston and a pressure chamber 96 on the other side thereof. A compression spring 98 in the pressure chamber 96 cooperates with the pressure of the fluid in the chamber to urge the piston 90 upwardly and the valve 34 toward its closed position. A valve stem 100 connects the valve 34 with the piston 90, the stem passing through the pressure chamber 94.

A branch 102 connects the branch 88 to a point of controlled discharge 108, the branch 102 including a metered restriction 104 between the point of connection with the branch 88 and another branch 106 connected with the pressure chamber 96. The discharge end 108 of the branch 102 includes a restriction or nozzle 110 permitting a higher rate of flow than the metered restriction 104.

The pivoted lever 64 carries a valve member 112 which cooperates with the discharge end of the nozzle 110 to regulate the rate of discharge therefrom as a function of the position of the lever, and consequently to regulate the back pressure existing in the branch 106 and pressure chamber 96. A compression spring 111, acting on the lower end of the lever 64, on the other side of the fulcrum occupied by the valve 112 and producing a force opposing the force produced by the fluid on the valve 112, urges the valve toward the nozzle 110. One end of the spring 111 contacts the lower end of the lever 64, and the other end is supported by an adjustable supporting member 113 carried by a fixed abutment.

The invention also includes a fail-safe control which maintains the valve 34 closed to prevent feed of fuel until a predetermined operating pressure exists in both propellant feed lines, and which automatically closes the valve upon failure of pressure in either feed line. This control comprises a double acting valve 114 at the junction of the pressure tap 84, the drain branch 86 and branch 88, which may be moved upwardly to engage a valve seat in the pressure tap 84 to stop the admission of propellant from the pressure tap 84 into the fluid pressure system while connecting the branch 88 with the drain branch 86, to drain fluid from the system, and which may be moved downwardly to engage a valve seat in the drain branch 86 to prevent the discharge from the system while connecting the branch 88 with the pressure tap 84 to admit pressure fluid into the system. An actuating lever 118 pivoted at 119, connects the valve 114 with a rod 120. The rod 120 is connected with the movable wall of a bellows 116, the other end of the rod being in contact with a compression spring 122 supported by a fixed abutment 124. The pressure chamber of the bellows 116 is in communication with the second propellant feed line 30 by a pressure tap 126.

The numeral 128 indicates an operating means for the cam 80, by which the fuel-oxidizer ratio can be varied manually or automatically in response to some operating condition of the rocket motor.

The operation is as follows: Assuming that the rocket motor is not in operation, and that there is no fluid under pressure in any of the lines, the valve 34 is retained on its seat by the spring 98, the double acting valve 114 is retained in its uppermost position by action of the spring 122, closing the pressure tap 84, and the valve 112 is retained against the discharge end of the nozzle 110 by the spring 111. The operating means 128 can be set for the desired fuel-oxidizer ratio. The pumps 28 and 32 are set into operation to supply propellants to the feed lines 26 and 30. The propellant feed line 26 becomes filled with a first propellant up to the closed valve 34, the propellant filling the pressure tap connections 46 and 48, the pressure chambers 50 and 52 and the annular gap 44. As there is no flow in the feed line 26, the pressure is the same at all points, and therefore the pressure of the propellant in the pressure chamber 50 acting on the left hand face of the piston 42, and the pressure of the propellant in the pressure chamber 52 and the pressure of the temperature-responsive fluid within the bellows 54 acting on the right hand face of the piston 42, are equal and act in opposite directions. The forces acting on the piston are in equilibrium, and the piston 42 produces no movement on the upper end of the lever 64, and the spring 111 continues to retain the valve 112 in contact with the discharge end of the nozzle 110. Propellant enters the pressure tap 84, but the valve 114, being in its upper position, prevents any flow into the branch line 88. On the other hand, the branch line 88 is in communication with the drain branch 86, and any propellant within the fluid pressure control system is free to drain therefrom.

Operation of the pump 32 quickly fills the second propellant feed line 30, the propellant therein filling the pressure taps 58 and 60, the pressure chambers 50' and 52' and the annular gap 44', flowing into the manifold 22 and discharging through the nozzles 24 into the combustion chamber 12. The propellant in the feed line 30 also fills the pressure tap 126 and the interior of the bellows 116. When the pressure within the propellant feed line 30 becomes sufficiently high to overcome the compression of the spring 122, the double acting valve 114 is moved to its lowermost position, thereby placing the branch line 88 in communication with the pressure tap 84 and cutting off communication between the branch line 88 and the drain branch 86. The propellant from the propellant feed line 26 quickly fills the various passages in the fluid pressure control system, including the pressure chambers 94 and 96 of the servomotor cylinder 92. Since there is no flow of propellant in the second propellant feed line 30, the pressure at the restriction 56 therein is considerably less than the pressure upstream and downstream therefrom, and the piston 42' of the sensing means 38 is moved toward the right, overcoming the force of the spring 111, causing a counterclockwise movement of the lever 64 about the fulcrum 68 and a movement of the valve 112 away from the end of the nozzle 110. The restriction 104 in the branch line 102 produces a pressure drop therein, as the propellant downstream of the restriction is free to discharge through the open nozzle 110. The upstream side of the restriction 104 is therefore at a relatively high pressure, which is effective in the pressure chamber 94 to act on the upper surface of the piston 90 to force the piston downwardly against the force of the spring 98 to move the valve 34 to its open position. The pressure chamber 96 below the piston is in communication with the branch 102 down-stream of the restriction 104, and consequently there is no fluid pressure therein to oppose the downward movement of the piston 90. As the valve 34 is opened, the propellant in the first propellant feed line 26 is delivered through the jacket 16 of the rocket motor 10, manifold 18 and injector nozzles 20 into the combustion chamber 12, wherein it is mixed with the propellant delivered by the nozzles 24. Suitable means, not shown, are provided to ignite the mixture.

As soon as the valve 34 opens, the flow of propellant in the feed line 26 produces a pressure drop at the restriction 49 and a flow of propellant through the passages of the first sensing means 36, causing the piston 42 therein to move toward the right, which produces a pivotal movement of the lever 64 clockwise and a partial closing of the valve 112. The closing of the value 112 restricts the free discharge of propellant from the discharge nozzle 110, thereby imposing a back pressure in the branch 102 downstream of the restriction 104 and a consequent increase in pressure in the pressure chamber 96, which with the assistance of the spring 98, moves the piston 90 upwardly and the valve 34 toward its closing position. As the valve 34 moves toward its closing position, the flow of propellant in the feed line 26 is partially restricted, resulting in a decreased pressure differential between the restriction 49 and the feed line upstream thereof, which moves the piston 42 toward the left and a partial opening of the valve 112. Such movement continues until equilibrium is established.

A certain rate of mass flow in the first propellant feed line 26 will produce a force $F_1$ on the upper end of the lever 64, and a certain rate of mass flow in the second propellant feed line 30 will produce a force $F_2$ on the lower end of the lever. These forces act in opposite directions about the fulcrum 68, and are in equilibrium when $F_1 l_1 = F_2 l_2$, or when $F_1/F_2 = l_2/l_1$. These formulae also represent the ratio of the flows in the propellant feed lines. Any error in the ratio of $F_1/F_2$ causes a displacement of the lever 64, changing the position of the pilot valve 112 to vary the position of the servomotor and the valve 34 operated thereby until equilibrium is established.

The fuel-oxidizer ratio can be selectively varied at any time by operation of the operating means 128.

So long as the mass flow of propellants in the respective feed lines remains constant, the forces acting on the lever 64 will remain in equilibrium and the valve 34 will remain in its set position. An increase in rate of flow, assuming no change in temperature, in the propellant feed line 26 will produce a movement of the piston 42 to the right and a partial closing of the pilot valve 112, causing a closing movement of the control valve 34 until the predetermined flow ratio is reestablished. A decrease flow rate in the propellant feed line 26 will result in a reverse operation, with a consequent opening movement of the control valve. Similarly, an increase in temperature of the propellant in the feed line 26, with a consequent decrease in density of the propellant, will produce an expansion of the temperature responsive fluid in the bellows 54 causing a movement of the piston 42 toward the left to compensate for the density and the difference in the rate of flow through the annular gap 44. A decrease in temperature is followed by an opposite movement to compensate for the difference in density.

In the event of an increased rate of mass flow through the second propellant feed line 30, resulting in an increased pressure in the feed line and a decreased pressure in the restriction 56, the piston 42' is moved toward the right, producing a counterclockwise movement of the lever 64 and an opening of the pilot valve 112. This is followed by an opening movement of the valve 34 and an increased rate of flow in the propellant feed line 26 until the ratio is reestablished. The reverse operation occurs upon a decrease of flow in the feed line 30.

From the above description, it is obvious that my invention provides a control for a combustion chamber adapted to maintain a predetermined ratio of mass flow of propellants in a pair of feed lines, and a means to vary the predetermined ratio to suit different propellants. The invention also provides a safety feature which permits the feeding of the oxidizer into the combustion chamber prior to the feeding of the fuel, and which does not permit the opening of the fuel valve until a predetermined pressure exists in the oxidizer feed line. This operation permits the oxidizer to scavenge any residual gases that may remain in the combustion chamber. Furthermore, the fuel valve cannot open until there is a predetermined feed pressure in both propellant feed lines, and the valve automatically closes in the event of failure of feed pressure in either propellant feed line or failure of feed pressure in both feed lines.

While only a single embodiment of the invention has been disclosed, it is obvious that other embodiments, falling within the scope of the appended claims, are possible. It will be understood that various changes may be made in the details of construction and in the arrangement of the parts of the control system disclosed herein without departing from the principles of the invention and the scope of the annexed claims.

I claim:

1. A fluid supply and control system for the combustion chamber of a rocket motor, comprising: a fluid feed line, a pump delivering a fluid under pressure to said line; said feed line including a valve, downstream from said pump, controlling the flow of fluid, and a restricted flow section between said pump and said valve; and means, sensing the mass flow of fluid in said feed line between said pump and said valve, regulating the position of said valve, said means including a cylinder, a piston loosely fitting within said cylinder to permit flow between the piston and cylinder, said cylinder having a section into which the piston is movable with a varying length to provide a variable length restricted flow path between the cylinder and piston, a first pressure tap from said feed line connected to said cylinder on one side of said piston, a second pressure tap from said restricted flow section connected to said cylinder on the other side of said piston, means, responsive to the temperature of the fluid in said feed line, connected to said piston to modify the position in said cylinder as a function of the fluid temperature, and means connecting said piston to said valve.

2. A fluid supply and control system as defined in claim 1, in which said means responsive to the fluid temperature includes a temperature responsive fluid-containing bellows within said cylinder and operatively connected to the piston therein.

3. A fluid supply and control system as defined in claim 1, in which said connecting means includes a servomotor connected to said valve, a pressure line connected to said servomotor, and a pilot valve operable by said piston controlling the pressure line and thereby regulating the position of the valve in said fluid feed line.

4. A rocket motor, comprising: a combustion chamber; a first feed line connected to said combustion chamber supplying one propellant; a second feed line connected to said combustion chamber supplying another propellant; a flow regulating valve in said first feed line to control the flow of propellant therein; means maintaining said valve closed in the absence of propellant under pressure in said first feed line; means, responsive to a flow condition in both of said propellant feed lines, to regulate the position of said valve; and means, responsive to a predetermined pressure in the second feed line operable to place said flow regulating valve in operation.

5. A rocket motor as defined in claim 4, in which the flow condition means are responsive to the mass flow rates in both feed lines.

6. A rocket motor as defined in claim 4, in which the means to regulate the position of said valve includes a pressure fluid system, a servomotor, a pilot valve and a source of fluid pressure to said system, and a fluid drain from said system, and in which said means responsive to a predetermined pressure includes valve means operable below said predetermined pressure condition to prevent flow of fluid pressure to said system and to open said fluid drain from said system, and is operable above said predetermined pressure to close the fluid drain and to admit pressure fluid to said system.

7. A rocket motor as defined in claim 4, in which the means to regulate the position of said valve includes a pressure fluid system, a servomotor, a pilot valve, and a connection between said feed line having said valve therein and said pressure fluid system, upstream of said valve, and a fluid drain from said system, and in which said means responsive to a predetermined pressure includes a valve means operable below said predetermined pressure condition to close said connection and to open said fluid drain, and is operable above said predetermined pressure to open said connection and to close said fluid drain.

8. Apparatus for sensing the mass flow of a fluid in a conduit having a restricted flow section, comprising: a cylinder; a piston movable and loosely fitting within said cylinder to provide a flow of fluid between the piston and cylinder, said cylinder having a section into which the piston is movable with a varying length to provide a variable length restricted flow path between the piston and cylinder; a first flow connection from one end of said piston with the conduit; a second flow connection from the other end of said piston with the restricted flow section, whereby a portion of the fluid from said conduit flows through said cylinder and returns to the restricted flow section and produces a differential force on the opposite ends of the piston; and means, responsive to the temperature of the fluid flowing through said cylinder, connected with said piston to modify the position within the cylinder as a function of the temperature of said fluid.

9. Apparatus for sensing the mass flow of a fluid in a conduit having a restricted flow section, comprising: a cylinder; a piston movable and loosely fitting within said cylinder to provide a flow of fluid between the piston and cylinder, said cylinder having a smaller diameter portion and a larger diameter portion, said piston being loosely fitted and movable within both portions, the parts being so disposed that an increased rate of flow of fluid produces a movement of the piston from the portion having a smaller diameter toward the portion having a larger diameter; a first flow connection from one end of said piston with the conduit; a second flow connection from the other end of said piston with the restricted flow section, whereby a portion of the fluid from said conduit flows through said cylinder and returns to the restricted flow section and produces a differential force on the opposite ends of the piston; and means, responsive to the temperature of the fluid flowing through said cylinder, connected with said piston to modify the position within the cylinder as a function of the temperature of said fluid.

10. Apparatus for sensing the mass flow of a fluid in a conduit having a restricted flow section, comprising: a cylinder; a piston movable and loosely fitting within said cylinder to provide a flow of fluid between the piston and cylinder; a first flow connection from one end of said piston with the conduit; a second flow connection from the other end of said piston with the restricted flow section, whereby a portion of the fluid from said conduit flows through said cylinder and returns to the restricted flow section and produces a differential force on the opposite ends of the piston; and means, responsive to the temperature of the fluid flowing through said cylinder, connected with said piston to modify the position within the cylinder as a function of the temperature of said fluid, said temperature responsive means including a bellows within the cylinder, said bellows containing a temperature sensitive fluid and being connected at one end with the piston and at its other end with a wall of the cylinder.

11. A fluid supply and control system for the combustion chamber of a rocket motor, comprising: a first feed line, a first pump supplying one fluid under pressure through said first feed line, a first by-pass connected with said first feed line, means establishing a pressure differential across said first by-pass line which varies as a function of the rate of fluid flow in said first feed line; a second feed line, a second pump supplying another fluid under pressure through said second feed line, a second by-pass connected with said second feed line, means establishing a pressure differential across said second by-pass line which varies as a function of the rate of fluid flow in said second feed line; a control valve in one of said feed lines; and means, within each of said by-pass lines, movable in response to the temperature of the fluid therein and in response to the pressure differential across said by-pass lines, regulating said valve.

12. A fluid supply and control system for the combustion chamber of a rocket motor, comprising: a first feed line, a first pump supplying one fluid under pressure through said first feed line, a first by-pass connected with said first feed line, means establishing a pressure differential across said first by-pass line which varies as a function of the rate of fluid flow in said first feed line; a second feed line, a second pump supplying another fluid under pressure through said second feed line, a second by-pass connected with said second feed line, means establishing a pressure differential across said second by-pass line which varies as a function of the rate of fluid flow in said second feed line; a control valve in one of said feed lines; means, within each of said by-pass lines, movable in response to the temperature of the fluid therein and in response to the pressure differential across said by-pass line, and means, movable in response to the differential movement of said means within said by-pass lines, regulating said valve to maintain a predetermined ratio of fluids supplied to said combustion chamber.

13. A fluid supply and control system as defined in claim 12, in which said regulating means includes a pivoted lever, said means within said by-pass lines being connected to opposite ends of the lever, and means, responsive to the position of the lever, to regulate the position of said valve.

14. A fluid supply and control system as defined in claim 12, in which said regulating means includes a pivoted lever, said means within said by-pass lines being connected to opposite ends of the lever, means to selectively vary the position of the fulcrum of said lever to vary the ratio of fluid flow, and means, responsive to the position of the lever, to regulate the position of said valve.

15. A fluid supply and control system for the combustion chamber of a rocket motor, comprising: a first feed line having a restricted flow section, a first pump supplying one fluid under pressure through said first feed line; a second feed line having a restricted flow section, a second pump supplying another fluid under pressure through said second feed line; a control valve in one of said feed lines downstream from the pump therein; a first means sensing the mass flow rate in the first feed line downstream from the pump therein; a second means sensing the mass flow rate in the second feed line downstream from the pump therein; each sensing means including a cylinder, a piston loosely fitting within the cylinder to permit a flow between the piston and cylinder, said cylinder having a section into which the piston is movable with a varying length to provide a variable length restricted flow path between the piston and cylinder, a first connection between the respective feed line and the cylinder on one side of the piston, a second connection between the restricted flow section in the respective feed line and the cylinder on the other side of the piston, and means, responsive to the temperature in the respective feed line, connected with the piston to modify the position in said cylinder as a function of the temperature in the respective feed line; and means connecting said first and second sensing means and said valve, and responsive to the difference in mass flow rates in said feed lines downstream from the pumps therein, to regulate said valve to maintain a predetermined ratio of fluids.

16. A fluid supply and control system for the combustion chamber of a rocket motor, comprising: a first feed line having a restricted flow section, a first pump supplying one fluid under pressure through said first feed line; a second feed line having a restricted flow section, a second pump supplying another fluid under pressure through said second feed line; a control valve in one of said feed lines downstream from the pump therein; a first means sensing the mass flow rate in the first feed line downstream from the pump therein; a second means sensing the mass flow rate in the second feed line downstream from the pump therein; each sensing means including a cylinder, a piston loosely fitting within the cylinder to permit a flow between the piston and cylinder, said cylinder having a section into which the piston is movable with a varying length to provide a variable length restricted flow path between the piston and cylinder, a first connection between the respective feed line and the cylinder on one side of the piston, a second connection between the restricted flow section in the respective feed line and the cylinder on the other side of the piston, and a bellows, containing a temperature-responsive fluid, within said cylinder and connected with the piston therein, to modify the position of the piston in said cylinder as a function of the temperature of the fluid in the respective feed line; and means connecting said first and said second sensing means and said valve, and responsive to the difference in mass flow rates in said feed lines downstream from the pumps therein, to regulate said valve to maintain a predetermined ratio of fluids.

References Cited in the file of this patent
UNITED STATES PATENTS

| 2,367,176 | Ahlstrom | Jan. 16, 1945 |
| 2,564,127 | Orr | Aug. 14, 1951 |
| 2,606,420 | Moore | Aug. 12, 1952 |
| 2,637,334 | Starkey | May 5, 1953 |
| 2,857,739 | Wright | Oct. 28, 1958 |
| 2,949,007 | Aldrich | Aug. 16, 1960 |